United States Patent Office 2,889,356
Patented June 2, 1959

2,889,356

CONJUGATED DIACETYLENIC GLYCOL ESTERS

George E. Bennett, Glendale, Mo., and Margaret D. Cameron, Kettering, Ohio, assignors to Monsanto Chemical Company, St. Louis, Mo., a corporation of Delaware No Drawing. Application November 29, 1955
Serial No. 549,867

6 Claims. (Cl. 260—475)

This invention relates to coupling carboxylic acid esters of acetylenic alcohols. More particularly, it relates to the coupling of half-esters of dicarboxylic acids and acetylenic alcohols, to produce conjugated diacetylenic glycol di-half-esters, and to the novel biological toxicant products thereof.

It has been known in the art previously to couple acetylenic carboxylic acid esters of aliphatic alcohols, in the presence of cuprous chloride, ammonia and ammonium chloride, to give diacetylenic dicarboxylic diesters, in accordance with the general equation for coupling acetylenic compounds

where A and B are the residues of the acetylenic compounds and may be the same or different.

It has also been known previously to prepare the esters of diacetylenic glycols by esterification of the preformed glycol with, for example, an acid anhydride or acid halide.

The direct coupling of a carboxylic acid ester of an acetylenic alcohol has not, however, been reported previously. Attempts to couple such esters of acetylenic alcohols and monocarboxylic acids free of acetylenic unsaturation have not led to the desired result; cleavage of the ester may occur, with some subsequent coupling of the alcohol, but neither in acid nor in alkaline coupling media has it been possible to prepare the desired diester of a diacetylenic glycol directly by a coupling reaction.

It has now surprisingly been found that diesters of diacetylenic glycols may be readily prepared by the oxidative coupling of a half-ester of an acetylenic carbinol with a dicarboxylic acid. The reaction may be illustrated by the following equation:

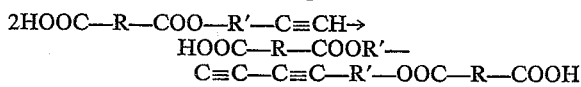

wherein HOOC—R—CO— represents the acid-generated portion of the half-ester and —O—R'—C≡CH represents the acetylenic alcohol residue.

Esters which may be coupled by the present process include half-esters of acetylenic alcohols containing a free acetylenic hydrogen atom and alkanedioic, alkenedioic, aralkanedioic and cycloalkane-, arene-, and alkarenedicarboxylic acids and substitution products thereof, e.g., halo-, nitro-, alkoxy-, etc., substituted dicarboxylic acids free of acetylenic unsaturation.

As examples of esters of alkanedioic acids with acetylenic alcohols containing a free acetylenic hydrogen atom which may be coupled by the process of the invention may be listed, e.g., the half-esters of primary acetylenic alcohols such as 2-propynyl hydrogen succinate, 2-propynyl hydrogen glutarate, 2-propynyl hydrogen adipate, 2-propynyl hydrogen pimelate, 3-butynyl hydrogen succinate, 2-ethyl-4-pentynyl hydrogen succinate, 4-pentynyl hydrogen adipate, 2-methyl-3-butynyl hydrogen succinate, 2-methyl-4-pentynyl hydrogen succinate, etc. Examples of half-esters of secondary acetylenic alcohols and dicarboxylic alkanedioic acids which may be coupled by the process of the invention are 1-methyl-2-propynyl hydrogen succinate, 1-ethyl-2-propynyl hydrogen succinate, 1-propyl-2-propynyl hydrogen glutarate, 1-isopropyl-2-propynyl hydrogen succinate, 1-phenyl-2-propynyl hydrogen succinate, 1-ethynyloctyl hydrogen succinate, 1-methyl-2-propynyl hydrogen adipate, 1-isopropyl-2-propynyl hydrogen glutarate, 1-ethynylpentyl hydrogen glutarate, etc. Half-esters of tertiary acetylenic alcohols and alkanedioic acids which may be coupled by the process of the invention are 1-methyl-1-propyl-2-propynyl hydrogen succinate, 1-isopropyl-1-methyl-2-propynyl hydrogen succinate, 1,1-diethyl-2-propynyl hydrogen succinate, 1-ethynyl-1-methylpentyl hydrogen succinate, 1-ethynylcyclopentanol hydrogen glutarate, 1,1-dimethyl-2-propynyl hydrogen pimelate, 1,1-dimethyl-2-propynyl hydrogen glutarate, etc.

Examples of presently useful half-esters of acetylenic alcohols containing a free acetylenic hydrogen atom with dicarboxylic alkenedioic acids are, e.g., esters of primary alcohols such as 2-propynyl hydrogen maleate, 3-butynyl hydrogen maleate, 2-methyl-3-butynyl hydrogen maleate, 2-ethyl-4-pentynyl hydrogen maleate, 10-undecynyl hydrogen maleate, 2-propynyl hydrogen chloromaleate, 2-propynyl hydrogen citraconate, 2-propynyl hydrogen fumarate, 3-butynyl hydrogen chloromaleate, 3-butynyl hydrogen citraconate, 4-pentynyl hydrogen citraconate, 2-methyl-3-butynyl hydrogen chloromaleate, 2-methyl-4-pentynyl hydrogen citraconate, etc.; esters of secondary alcohols, such as 1-methyl-2-propynyl hydrogen maleate, 1-methyl-2-propynyl hydrogen chloromaleate, 1-methyl-2-propynyl hydrogen citraconate, 1-ethyl-2-propynyl hydrogen maleate, 1-propyl-2-propynyl hydrogen maleate, 1-isopropyl-2-propynyl hydrogen citraconate, 1-(2-furyl)-2-propynyl hydrogen maleate; and esters of tertiary alcohols such as 1,1-dimethyl-2-propynyl hydrogen maleate, 1,1-diethyl-2-propynyl hydrogen maleate, 1-ethynyl-1-methylpentyl hydrogen maleate, 1-ethyl-1-methyl-2-propynyl hydrogen citraconate, 1-ethynyl-1,2-dimethylpentyl hydrogen citraconate, 1,1-diphenyl-2-propynyl hydrogen citraconate, etc.

The esters of acetylenic alcohols containing a free acetylenic hydrogen atom and dicarboxylic acids containing a carbocyclic ring i.e., cycloaliphatic, alkaryl, and aralkyl acids, are especially readily coupled by the present process. As examples of presently useful cycloaliphatic and cycloalkanedialkanoic acid half-esters may be listed, e.g., esters with primary acetylenic alcohols such as 2-propynyl hydrogen 1,4-cyclohexanedicarboxylate, 2-propynyl hydrogen bicyclo[2.2.1]heptane-2,3-dicarboxylate, 2-propynyl hydrogen norcamphorate; esters with secondary acetylenic alcohols such as 1-ethyl-2-propynyl hydrogen 1,3-cyclohexanediacetate, 1-methyl-2-propynyl hydrogen apocamphorate, etc.; and esters with tertiary acetylenic alcohols, such as 1,1-dimethyl-2-propynyl hydrogen norcamphorate, 1-methyl-1-propyl-2-propynyl hydrogen 2-methyl-1,4-cyclohexanedicarboxylate, 1,1-diethyl-2-propynyl hydrogen 1,4-cyclohexanedicarboxylate, etc. Cycloalkenyl, aryl, alkaryl and arylalkyl dicarboxylic acid half-esters which may be coupled by the present process include, e.g., 2-propynyl hydrogen bicyclo[2.2.1]hept-5-ene-2,3-dicarboxylate, 2-propynyl hydrogen isophthalate, 3-butynyl hydrogen 2-methylterephthalate, 2-propynyl hydrogen p-phenylenediacetate, 1-methyl-2-propynyl hydrogen 0-phenyleneacetate-β-propionate, 1-propyl-2-propynyl hydrogen 4-ethyl-1-cyclohexene-1,4-dicarboxylate, 1,1-dimethyl-2-propynyl hydrogen m-phenylenediacetate, etc.

Particularly preferred in the present process are the half-esters of an acetylenic alcohol and a dicarboxylic acid containing a 6-membered carbocyclic nucleus, wherein the acid is free of acetylenic unsaturation, and wherein the two carboxyl groups of the said acid are linked to carbon atoms of the carbocyclic nucleus which are in the ortho-position to one another, no more than one methylene radical intervening between the carboxylic groups and the carbocyclic nucleus.

Examples of arylalkanedioic acid half-esters of the preferred structure are, e.g., esters with primary acetylenic alcohols, such as 2-propynyl hydrogen o-phenylenediacetate, 2-propynyl hydrogen homophthalate, 3-butynyl hydrogen o-phenylenediacetate, 3-butynyl hydrogen homophthalate, 4-pentynyl hydrogen o-phenylenediacetate, 2-methyl-3-butynyl hydrogen homophthalate; esters with secondary acetylenic alcohols, such as 1-methyl-2-propynyl hydrogen o-phenylenediacetate, 1-propyl-2-propynyl hydrogen o-phenylenediacetate, 1-ethynylbutyl hydrogen o-phenylenediacetate, 1-ethyl-2-propynyl hydrogen homophthalate, 1-isopropyl-2-propynyl hydrogen homophthalate, etc.; and esters with tertiary acetylenic alcohols, such as 1,1-dimethyl-2-propynyl hydrogen o-phenylenediacetate, 1-ethyl-1-methyl-2-propynyl hydrogen homophthalate, 1-methyl-1-propyl-2-propynyl hydrogen homophthalate, etc.

Examples of half-esters of dicarboxylic acids of the preferred structure wherein both carboxylic groups are attached directly to the carbocyclic ring in the ortho-position to one another are, e.g., esters with primary acetylenic alcohols such as 2-propynyl hydrogen phthalate, 2-propynyl hydrogen 3-nitrophthalate, 2-propynyl hydrogen 4-tert-butylphthalate, 2-propynyl hydrogen 3-methoxyphthalate, 2-propynyl hydrogen tetrahydrophthalate, 3-butynyl hydrogen phthalate, 3-butynyl hydrogen tetrahydrophthalate, 2-methyl-3-butynyl hydrogen phthalate, 2-ethyl-4-pentynyl hydrogen phthalate, etc.; half-esters with secondary acetylenic alcohols containing a free acetylenic hydrogen atom, such as 1-methyl-2-propynyl hydrogen 3-nitrophthalate, 1-ethyl-2-propynyl hydrogen phthalate, 1-isopropyl-2-propynyl hydrogen 3-ethoxyphthalate, 1-ethynylpentyl hydrogen phthalate, 1-phenyl-2-propynyl hydrogen phthalate, 1-ethynylheptyl hydrogen phthalate, 1-ethynyl-2-ethylhexyl hydrogen phthalate, 1-methyl-2-propynyl hydrogen 4-tert-butylphthalate, 1-ethynylheptyl hydrogen tetrahydrophthalate, 1-ethynyl-2-ethylhexyl hydrogen tetrahydrophthalate, 1-phenyl-2-propynyl hydrogen tetrahydrophthalate, etc.; and esters with tertiary acetylenic alcohols, such as 1,1-dimethyl-2-propynyl hydrogen phthalate, 1-ethyl-1-methyl-2-propynyl hydrogen phthalate, 1-isopropyl-1-methyl-2-propynyl hydrogen phthalate, 1-ethynyl-1-methylpentyl hydrogen 3-nitrophthalate, 1 - ethynyl - 1,2 - dimethylpentyl hydrogen phthalate, 1,1-diphenyl-2-propynyl hydrogen phthalate, 1,1-dimethyl-2-propynyl hydrogen 3-methoxyphthalate, 1,1-dimethyl-2-propynyl hydrogen tetrahydrophthalate, 1-ethynyl - 1 - cyclohexyl hydrogen 4 - methoxytetrahydrophthalate, 2,2-dimethyl-1-ethynyl-1-cyclopentyl hydrogen tetrahydrophthalate, 1-isopropyl-1-methyl-2-propynyl hydrogen tetrahydrophthalate, 1,1-diphenyl-2-propynyl hydrogen tetrahydrophthalate, etc.

The products of the present process are compounds wherein one mole of a conjugated diacetylenic glycol is combined through ester linkages with two moles of a dicarboxylic acid. By a conjugated diacetylenic glycol is here meant a dihydric alcohol wherein a chain of carbon atoms which includes the conjugated diacetylenic group, —C≡C—C≡C—, intervenes between the carbon atoms to which the two hydroxy groups of the glycol are attached. The present glycol esters may be described as di-half-esters, where by a di-half-ester of a glycol with a dicarboxylic acid is here meant a compound wherein one mole of the glycol is esterified with two moles of the dicarboxylic acid, so that each of the two acid residues in a molecule of the di-half-ester contains one free carboxyl group and one carboxyl group which has been esterified with a hydroxy group of the glycol. The present compounds are referred to hereinafter as di-half-esters of conjugated diacetylenic glycols and dicarboxylic acids.

As examples of products of coupling half-esters of acetylenic alcohols and alkanedicarboxylic acids by the present process may be listed 2,4-hexadiyne-1,6-diol di(hydrogen succinate), 2,4-hexadiyne-1,6-diol di(hydrogen glutarate), 2,4-hexadiyne-1,6-diol di(hydrogen adipate), 3,5-octadiyne-1,8-diol di(hydrogen succinate), 3,5-octadiyne-1,8-diol di(hydrogen glutarate), 3,5-octadiyne-1,8-diol di(hydrogen pimelate), 2,7-dimethyl-3,5-octadiyne-1,8-diol di(hydrogen succinate), 3,5-octadiyne-2,7-diol di(hydrogen succinate), 1,6-diphenyl-2,4-hexadiyne-1,6-diol di(hydrogen glutarate), 2,11-dimethyl-5,7-dodecadiyne-4,9-diol di(hydrogen succinate), 1,1,6,6-tetraphenyl-2,4-hexadiyne-1,6-diol di(hydrogen succinate), 2,7-dimethyl-3,5-octadiyne-2,7-diol di(hydrogen succinate), etc. Examples of the products of coupling of half-esters of acetylenic alcohols containing a free acetylenic hydrogen atom and alkenedioic acids are, e.g., 2,4-hexadiyne-1,6-diol di(hydrogen maleate), 2,4-hexadiyne-1,6-diol di(hydrogen fumarate), 2,4-hexadiyne-1,6-diol di(hydrogen chloromaleate), 2,4-hexadiyne-1,6-diol di(hydrogen citraconate), 2,7-dimethyl-3,5-octadiyne-1,8-diol di(hydrogen maleate), 4,6-decadiyne-1,10-diol di(hydrogen maleate), 3,5-octadiyne-1,8-diol di(hydrogen citraconate), 3,5-octadiyne-2,7-diol di(hydrogen citraconate), 1,6-diphenyl-2,4-hexadiyne-1,6-diol di(hydrogen maleate), 1,6-diphenyl-2,4-hexadiyne-1,6-diol di(hydrogen citraconate), 2,7-dimethyl-3,5-octadiyne-2,7-diol di(hydrogen maleate), 2,7-dimethyl-3,5-octadiyne-2,7-diol di(hydrogen fumarate), 1,1,6,6 - tetraphenyl - 2,4 - hexadiyne - 1,6 - diol di(hydrogen maleate), 1,1,6,6-tetraphenyl-2,4-hexadiyne-1,6-diol di(hydrogen citraconate), etc.

As examples of the products of coupling aralkanedioic half-esters of acetylenic alcohols by the process of the present invention may be listed, e.g., 2,4-hexadiyne-1,6-diol di(hydrogen o-phenylenediacetate), 2,4-hexadiyne-1,6-diol di(hydrogen homophthalate), 2,7-dimethyl-3,5-octadiyne-1,8-diol di(hydrogen o-phenylenediacetate), 4,6-decadiyne-1,10-diol di(hydrogen homophthalate), 3,5-octadiyne-2,7-diol di(hydrogen homophthalate), 1,6-diphenyl-2,4-hexadiyne-1,6-diol di(hydrogen p-phenylenediacetate), 1,6-diphenyl-2,4-hexadiyne-1,6-diol di(hydrogen homophthalate), etc. Particularly useful products of the present process are the di-half-esters of conjugated diacetylenic glycols with 6-membered-ring carbocyclic o-dicarboxylic acids, such as 2,4-hexadiyne-1,6-diol di(hydrogen phthalate), 2,4-hexadiyne-1,6-diol di(hydrogen 3-nitrophthalate), 2,4-hexadiyne-1,6-diol di(hydrogen 4-isopropylphthalate), 2,4-hexadiyne-1,6-diol di(hydrogen 3-methoxyphthalate), 2,4-hexadiyne-1,6-diol di(hydrogen tetrahydrophthalate), 2,4-hexadiyne-1,6-diol di(hydrogen 1,2-cyclohexanedicarboxylate), 2,4-hexadiyne-1,6-diol di(hydrogen norcamphorate), 3,5-octadiyne-1,8-diol di(hydrogen phthalate), 3,5-octadiyne-1,8-diol di(hydrogen tetrahydrophthalate), 2,7-dimethyl-3,5-octadiyne-1,8-diol di(hydrogen phthalate), 2,7-dimethyl-3,5-octadiyne-1,8-diol di(hydrogen 4-butylphthalate), 4,6-decadiyne-1,10-diol di(hydrogen phthalate), 3,5-octadiyne-2,7-diol di(hydrogen phthalate), 3,5-octadiyne-2,7-diol di(hydrogen 3-ethoxyphthalate), 3,5-octadiyne-2,7-diol di(hydrogen tetrahydrophthalate), 1,6-diphenyl-2,4-hexadiyne-1,6-diol di(hydrogen 3-chlorophthalate), 1,1,6,6-tetraphenyl-2,4-hexadiyne-1,6-diol di(hydrogen phthalate), 1,6-diphenyl-2,4-hexadiyne-1,6-diol di(hydrogen 3-nitrophthalate), 1,6-diphenyl-2,4-hexadiyne-1,6-diol di(hydrogen tetrahydrophthalate), etc.

In carrying out the process of the invention the dicarboxylic acid half-ester is contacted with a cuprous halide and an ammonium halide in the presence of an oxidizing agent. The ratio of ester to cuprous salt in the reaction may vary, for example, from 2:1 to 5:1, and even lower proportions of the cuprous halide may be used if desired, though longer reaction times may then be required to tain the same yields. Amounts of cuprous halide equivalent to the molar quantities of acetylenic ester to be coupled, or greater, may also be employed, but the use of such quantities is generally uneconomic. The amount of ammonium chloride used in the reaction mixture varies with the reaction conditions. While the pH of the reaction mixture is not critical in the present process, generally higher yields may be obtained at a pH which is close to neutral, e.g., in the range of, say, from 5 to 9, though it is not excluded to operate at as low a pH as 2 or 3, or as high as 9 or 10. To adjust the acidity of the reaction mixture, conveniently ammonia may be added to the reactants. An intermediate in the present reaction is considered to be a copper amine complex which may be represented by the formula $Cu(NH_3)_2X$ where X is a halogen atom or acetylenic radical. Thus, the reaction mixture preferably contains 2 molar proportions of ammonia for each mole of cuprous ions present. The ammonia may be supplied, however, either by the ammonium halide component or by ammonia, which latter may be added to the reaction mixture as a gas or as ammonium hydroxide in aqueous solution. Thus, the amounts of ammonia and ammonium halide used in the present process may be varied in accordance with the amount of cuprous chloride present, and are also interdependent and alter in accordance with the pH at which the process is carried out.

The cuprous halide which takes part in the process of the invention may be supplied to the reaction mixture as such, i.e., by utilizing cuprous chloride, cuprous bromide, etc., or it may be formed in situ, by preparing a reaction mixture with a cuprous salt, such as cuprous oxide, which forms cuprous ions in solution, the halogen ions being supplied by the ammonium halide component of the reaction mixture. Alternatively, metallic copper in reactive form may be mixed with an ammoniacal solution of the ester.

The present process is preferably carried out in a solvent or diluent. Suitable reaction media are, for example, polar solvents such as water, ethanol, tetrahydrofuran, etc. While the reaction proceeds at a rapid rate at atmospheric pressure, it may be convenient to vary the pressure under which the process is conducted; particularly good results may be obtained by utilizing superatmospheric pressures. In one mode of operation of the process of the invention, the reaction mixture may be stirred or shaken vigorously under a slight oxygen pressure to afford the necessary oxidizing atmosphere. Another method of oxidizing the reaction mixture with gaseous oxygen consists of bubbling air through the reactants. Alternatively, oxidizing agents which may be applied in the present process are, for example, hydrogen peroxide, potassium ferricyanide, etc.

The temperature of the reaction mixture may be varied from less than 0° C. to any temperature below the decomposition temperatures of the reaction components. With application of super-atmospheric pressures, for example, higher temperatures may be usefully employed to accelerate the reaction, though generally the process is carried out conveniently at about room temperature. On completion of the reaction, the diacetylenic glycol di-half-ester product may be isolated by any suitable method, such as distillation, extraction, precipitation, etc.

The process is illustrated, but not limited, by the following example:

*Example 1*

A mixture of 12.5 grams (0.065 mole) of cuprous chloride, 20 grams (0.38 mole) of ammonium chloride, 6 ml. of ammonium hydroxide (1.5 grams, 0.09 mole), and 20.4 grams (0.10 mole) of 2-propynyl hydrogen phthalate in 150 ml. of water was stirred under an oxygen atmosphere for 20 hours. The blue-green solid which separated was filtered off and extracted with a mixture of 500 ml. of 3-normal sulfuric acid and 200 ml. of ether; after separation of the ether layer, the remaining aqueous acid solution was extracted with an additional 100 ml. of ether, which was combined with the first ether extract. The solid residue from evaporation of the ether extracts was recrystallized from a mixture of water and acetone to give 10.7 g. (55% theoretical yield) of 2,4-hexadiyne-1,6-diol di(hydrogen phthalate), M.P. 145.5–147° C. The glycol di-half-ester had the following analysis: 65.07% carbon, 3.67% hydrogen (calculated, 65.17% carbon, 3.48% hydrogen).

Similarly, by coupling 1-methyl-2-propynyl hydrogen maleate in an aqueous solution containing cuprous chloride, ammonia and ammonium chloride, there is obtained 3,5-octadiyne-2,7-diol di(hydrogen maleate).

Stirring an aqueous solution of 1,1-dimethyl-2-propynyl hydrogen succinate with cuprous chloride, ammonia and ammonium chloride under an oxygen atmosphere for over 20 hours gives 2,7-dimethyl-3,5-octadiyne-2,7-diol di(hydrogen succinate).

By a procedure as described in Example 1, 1-methyl-2-propynyl hydrogen homophthalate may be coupled to produce 3,5-octadiyne-2,7-diol di(hydrogen homophthalate). Similarly, 1-methyl-2-propynyl hydrogen tetrahydrophthalate is coupled to give 3,5-octadiyne-2,7-diol di(hydrogen tetrahydrophthalate).

On the other hand, when a mixture of 16.0 grams (0.10 mole) of 2-propynyl benzoate, 24.0 grams (0.45 mols) of ammonium chloride and 12.5 grams (0.65 mol) of couprous chloride was stirred under oxygen for 20 hours, extraction of the acidified reaction mixture gave 12.7 grams of 2-propynyl benzoate (79% recovery) and 1.2 grams of the coupled alcohol, 2,4-hexadiyne-1,6-diol. None of the corresponding dibenzoate could be detected. In a number of experiments under varied conditions, no coupling of 2-propynyl pelargonate could be detected in aqueous ammoniacal solutions containing cuprous chloride. The success of the present process for the production of esters of diacetylenic glycols is thus highly unexpected.

The diacetylenic glycol di-half-esters produced by the present reaction are useful for a variety of applications. For example, they may be used as pharmaceuticals, as biological toxicants, etc. The reactive nature of the products of the present invention also makes them convenient intermediates for the synthesis of other useful organic chemicals; for example, the unesterified carboxylic acid groups may be reacted with a base such as sodium hydroxide to produce water-soluble salts which may be used, e.g., as surfactants, or the free carboxylic groups may be esterified to produce polymerizable vinyl or allylic esters. The triple bonds of these diacetylenic compounds may be hydrogenated to form olefinic and paraffinic esters, etc.

The present novel compounds have particularly valuable biological toxicant properties. Thus, for example, at a dilution of 1 part per thousand, the 2,4-hexadiyne-1,6-diol di(hydrogen phthalate) of Example 1 exerts a bacteriostatic effect on *Micrococcus pyogenes* var. *aureus* and on *Salmonella typhosa*. The present di-half-esters are also very good agricultural fungicides. The testing of one of the novel esters of the invention as an agent for the control of tomato wilt is described in the following example.

*Example 2*

An emulsion of the product of Example 1 was prepared by mixing 100 mg. of the di-half-ester with 1 ml. of Tween-20, an emulsifying agent which is reputed to be a polyethylene oxide sorbitan monolaurate condensate, and 9 ml. of water. The resulting 1% stock emulsion was then diluted to a concentration of 100 p.p.m.

Three tomato plants in individual containers, each 4 to 5 weeks old and having at least 4 true leaves, were treated for three successive days with 30 ml. per pot per day of the 100 p.p.m. solution of the present hexadiynediol di(hydrogen phthalate). On the fourth day the tomato plants were uprooted, about a third of each root system was torn off, and the roots were washed in water and then immersed in a suspension of approximately $10^8$ bud cells per ml. of *Fusarium oxysporum f. lycopersici* for 30 seconds. The plants were repotted in fresh sand, and kept in a greenhouse with a control plant that had been similarly treated with the exception of the watering with the 2,4-hexadiyne-1,6-diol di(hydrogen phthalate). When the control plant showed marked disease symptoms, the treated tomato plants were cut off at soil level and the extent of control of the Fusarium wilt organism obtained by the treatment with the diacetylenic glycol ester was evaluated by counting the number of vascular discolorations in the large vascular bundles. It was found that very good control of the Fusarium fungus had been obtained by this treatment with only slight injury to the plants.

2-propynyl hydrogen phthalate, on the other hand, is too phytotoxic to be applied as a useful agricultural chemotherapeutant, even at a rate of 10 parts per million.

In another test it was found that the present 2,4-hexadiyne-1,6-diol di(hydrogen phthalate) at a concentration of 5000 parts per million, gives very good control of the wheat rust fungus as described in the following example.

*Example 3*

Spores of *Puccinia rubigo-vera tritici* were applied to the leaves of five six-day old seedlings of a rust-susceptible variety of wheat (Seneca). Following inoculation, the plants were sprayed with water and incubated at approximately 70° F. and 100% humidity for 36 to 48 hours, and then transferred to greenhouse benches for an additional 48 hours, after which each plant was sprayed with 10 ml. of a 1% emulsion of 2,4-hexadiyne-1,6-diol di(hydrogen phthalate), prepared as described in the Example 2. The wheat seedlings were then returned to the greenhouse benches and held for a week. Grading as to the number and size of disease pustules formed, and the prevalence thereof, showed that very good control of the wheat rust disease had been obtained by the foliage application of the present ester.

For application as agricultural fungicides, the present compounds may be dissolved in water, for example, in the form of their di-sodium salts, etc. or they may be emulsified, i.e., by dissolving them in an organic solvent such as acetone, adding an emulsifying agent such as a long chain alkylbenzenesulfonate, and diluting the resulting solution with water. The resulting aqueous preparations may be sprayed onto the foliage of the plants infected with a fungus, or may be applied to the soil in which the plants are growing. Applications of emulsions of the present novel compounds to the foliage of the infected plants has been found particularly effective in controlling fungal diseases. Alternatively, the present compounds may be incorporated in powdered carriers, such as talc, to give a convenient formulation for applying to plants the low concentrations required to give adequate control of fungus infections. Examples of fungus diseases which may be controlled by application of the present compounds are, e.g., tomato wilt, wheat rust, tomato leaf spot, etc. Agricultural formulations of the present diacetylenic glycol esters may be applied to the infected plants at, e.g., rates of from 5 to 10 pounds of active chemical per acre.

What is claimed is:

1. The process which comprises contacting in a polar medium a phthalic acid half-ester of a lower acetylenic primary alcohol containing a free acetylenic hydrogen atom with a cuprous halide, an ammonium halide, and an oxidizing agent, and isolating from the resulting reaction product a di(hydrogen phthalate) ester of a conjugated diacetylenic glycol.

2. The process which comprises contacting in a polar medium a phthalic acid half-ester of a lower acetylenic alcohol containing a free acetylenic hydrogen atom with cuprous chloride, ammonium chloride and an oxidizing agent and isolating from the resulting reaction product a di(hydrogen phthalate) ester of a conjugated diacetylenic glycol.

3. The process which comprises contacting in a polar medium 2-propynyl hydrogen phthalate with cuprous chloride, ammonium chloride, and an oxidizing agent, and isolating from the resulting reaction product, 2,4-hexadiyne-1,6-diol di(hydrogen phthalate).

4. The process which comprises contacting 2-propynyl hydrogen phthalate with oxygen and an aqueous solution containing cuprous chloride, ammonium chloride, and ammonia, and isolating from the resulting reaction product 2,4-hexadiyne-1,6-diol di(hydrogen phthalate).

5. A di(hydrogen phthalate) ester of a conjugated diacetylenic glycol having not more than 12 carbon atoms.

6. 2,4-hexadiyne-1,6-diol di(hydrogen phthalate).

References Cited in the file of this patent

UNITED STATES PATENTS

| | | |
|---|---|---|
| 2,533,323 | Lomartire | Dec. 12, 1950 |
| 2,570,038 | Smith | Oct. 2, 1951 |
| 2,602,088 | Groote | July 1, 1952 |
| 2,651,590 | Karsten | Sept. 8, 1953 |
| 2,655,460 | Kise | Oct. 13, 1953 |
| 2,757,119 | Bennett | July 31, 1956 |
| 2,784,136 | Dierick | Mar. 5, 1957 |

OTHER REFERENCES

Beilstein 1, 502 (1918).

Von Kutepow: B10S Final Report No. 357, item No. 22, pages 3 to 5, November 19, 1945.

Copenhaver et al.: "Acetylene and Carbon Monoxide Chemistry," pages 121 to 123, Reinhold, 1949.